United States Patent
Jing et al.

(10) Patent No.: US 10,460,034 B2
(45) Date of Patent: Oct. 29, 2019

(54) INTENTION INFERENCE SYSTEM AND INTENTION INFERENCE METHOD

(71) Applicant: Mitsubishi Electric Corporation, Tokyo (JP)

(72) Inventors: Yi Jing, Tokyo (JP); Yusuke Koji, Tokyo (JP); Jun Ishii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 133 days.

(21) Appl. No.: 15/546,801

(22) PCT Filed: Jan. 28, 2015

(86) PCT No.: PCT/JP2015/000367
§ 371 (c)(1),
(2) Date: Jul. 27, 2017

(87) PCT Pub. No.: WO2016/120904
PCT Pub. Date: Aug. 4, 2016

(65) Prior Publication Data
US 2017/0371863 A1 Dec. 28, 2017

(51) Int. Cl.
*G10L 15/22* (2006.01)
*G06F 17/27* (2006.01)
(Continued)

(52) U.S. Cl.
CPC ........ *G06F 17/2785* (2013.01); *G06F 17/271* (2013.01); *G06F 17/2755* (2013.01);
(Continued)

(58) Field of Classification Search
None
See application file for complete search history.

(56) References Cited

U.S. PATENT DOCUMENTS 8,380,489 B1 * 2/2013 Zhang ................. G06F 17/2785
704/4
2003/0220799 A1 * 11/2003 Kim ........................ G10L 15/22
704/277
(Continued)

FOREIGN PATENT DOCUMENTS

JP 2000-056944 A 2/2000
JP 2000-200273 A 7/2000
(Continued)

OTHER PUBLICATIONS

"Kakushu Media Shori no Yoso Gijutsu to Engine Kaihatsu ni Torikumu NTT Media Intelligence Kenkyusho no R&D Tenkai Zatsudan Taiwa Gijutsu Onsei Agent no Seino Kojo ni wa Zatsudan ga Hitsuyo Haba Hiroi Wadai ni Taio dekiru Taiwa Gijutsu o Kaihatsu", Business Communication, vol. 51, No. 2, Feb. 1, 2014, pp. 20-21.
(Continued)

*Primary Examiner* — Abul K Azad
(74) *Attorney, Agent, or Firm* — Birch, Stewart, Kolasch & Birch, LLP

(57) ABSTRACT

An intention inference system includes, a morphological analyzer to perform morphological analysis for a complex sentence with multiple intentions involved, a syntactic analyzer to perform syntactic analysis for the complex sentence morphologically analyzed by the morphological analyzer and to divide it into the first simple sentence and the second simple sentence, an intention inference unit to infer the first intention involved in the first simple sentence and the second intention involved in the second simple sentence, a feature extractor to extract as the first feature a morpheme showing execution order of operations involved in the first simple sentence and to extract as the second feature a morpheme showing execution order of operations involved in the second simple sentence, and an execution order inference unit to infer the execution order of the first operation corresponding to the first intention and the second operation corresponding to the second intention on the basis of the first feature and the second feature extracted by the feature extractor. This enables the system to infer user's intentions accurately.

10 Claims, 15 Drawing Sheets

(51) Int. Cl.
*G10L 15/02* (2006.01)
*G10L 15/26* (2006.01)

(52) U.S. Cl.
CPC .......... *G06F 17/2765* (2013.01); *G10L 15/02* (2013.01); *G10L 15/22* (2013.01); *G10L 15/26* (2013.01); *G10L 2015/025* (2013.01)

(56) References Cited

U.S. PATENT DOCUMENTS

2010/0241418 A1   9/2010   Maeda et al.
2012/0053942 A1   3/2012   Minamino et al.

FOREIGN PATENT DOCUMENTS

JP   2005-301017 A   10/2005
JP   2010-224194 A   10/2010
JP   2012-047924 A    3/2012

OTHER PUBLICATIONS

Hiroshi Fujimoto et al. "Development of Car Navigation System Operated by Naturally Speaking", The Transactions of the Institute Electronics, Information and Communication Engineers, vol. J96-D, No. 11, Nov. 1, 2013, pp. 2815-2824.

Mizuki Fujisawa et al. "A control method for the multiple actions of animated agents by natural language", IEICE Technical Report, vol. 101, No. 243, Jul. 24, 2001, pp. 31-38.

\* cited by examiner

Fig. 2

|  | iku (go) | mokuteki-chi (final destination) | keiyu-chi (intermediate destination) | Tokyo Tower | ... |
|---|---|---|---|---|---|
| setting a destination [{facility =Tokyo Tower}] | 0.3 | 0.3 | 0.01 | 0.1 | ... |
| setting an intermediate destination [{facility =Tokyo Tower}] | 0.2 | 0.01 | 0.3 | 0.1 | ... |
| ... | ... | ... | ... | ... | ... |

Fig. 3

| No. | Occurring-Location Condition | Part-of-Speech Condition |
|---|---|---|
| 1 | Beginning of sentence | Time representing noun plus kaku-joshi |
| 2 | End of sentence | Setsuzoku-joshi |
| ... | ... | ... |

Fig. 4

| No. | Execution order type |
|---|---|
| 1 | Simple sentence 1 first |
| 2 | Simple sentence 2 first |
| 3 | Execute together |
| 4 | Simple sentence 1 only |
| 5 | Simple sentence 2 only |

| feature<br>Execution order | simple sentence 1_node (since) | simple sentence 2_te (conjugative suffix of te-form of verb) | simple sentence 1_saki ni (first) | simple sentence 1_dakedo (but) | simple sentence 2_yappari (but) | simple sentence 2_mazu (first) | ... |
|---|---|---|---|---|---|---|---|
| Simple sentence 1 first | 0.07 | 0.2 | 0.45 | 0.2 | 0.1 | 0.2 | ... |
| Simple sentence 2 first | 0.25 | 0.2 | 0.2 | 0.2 | 0.35 | 0.45 | ... |
| Execute together | 0.03 | 0.2 | 0.05 | 0.2 | 0.15 | 0.05 | ... |
| Simple sentence 1 only | 0.05 | 0.2 | 0.1 | 0.2 | 0.1 | 0.2 | ... |
| Simple sentence 2 only | 0.6 | 0.2 | 0.2 | 0.2 | 0.3 | 0.1 | ... |

Fig. 8

| No. | Simple sentence 1 | Simple sentence 2 | Execution order |
|---|---|---|---|
| 1 | jikan ga kibishii node (Since my schedule is tight) | kosoku-dohro de itte (go along a highway) | Simple sentence 2 only |
| 2 | ruhto wo henkou shite (Change the route) | michi ha sugoku konnde iru kara | Simple sentence 1 only |
| 3 | tokyo tower mo yoritai ga (Indeed I want to visit Tokyo Tower) | saki ni skytree he yotte (but visit Skytree first) | Simple sentence 2 first |
| 4 | saki ni skytree ni yotte (I visit Skytree first) | tokyo tower he iku (and then go to Tokyo Tower) | Simple sentence 1 first |
| ... | ... | ... | ... |

Fig. 9

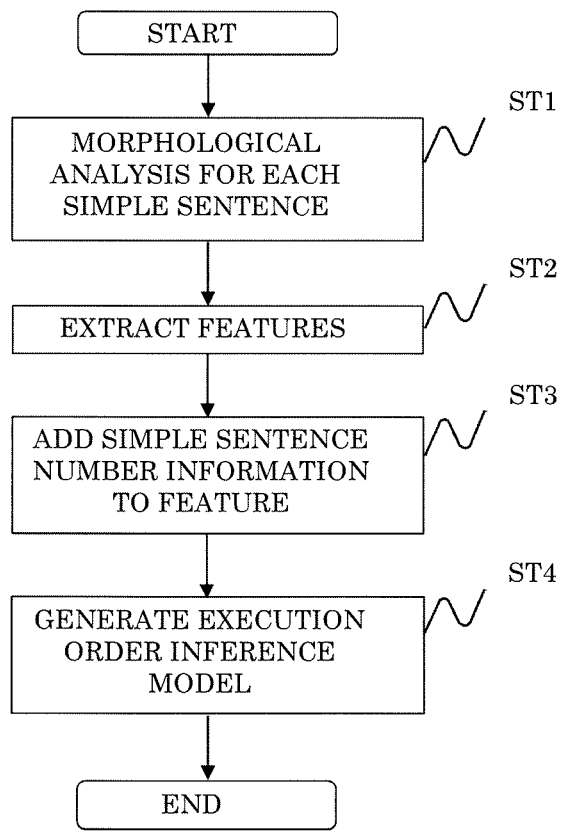

Fig. 10

S1: pi-tto nattara ohanashi kudasai
   (Please speak after the beep)
U1: XX he ikitai
   (I want to go to XX).
S2: XX wo mokuteki-chi ni settei shimashita
   (XX has been set as a destination).
U2: saki ni OO he yoritai no dakedo, yappari mazu ΔΔ he yoru
   (Before that, I want to visit OO, but I visit ΔΔ first).
S3: ΔΔ wo ichi-bamme no keiyu-chi ni tsuika shimasu
   (ΔΔ is being added as the first intermediate destination).
   OO wo ni-bamme no keiyu-chi ni tsuika shimasu
   (OO is being added as the second intermediate destination).

Fig. 12

| feature<br><br>Execution order | simple sentence 1_saki ni (first) | simple sentence 1_dakedo (but) | simple sentence 2_yappari (but) | simple sentence 2_mazu (first) | ... |
|---|---|---|---|---|---|
|  |  |  |  |  |  |
|  |  |  |  |  |  |
|  |  |  |  |  |  |
|  |  |  |  |  |  |
|  |  |  |  |  |  |

Fig. 13

$$S \text{ (final score)} = \prod_i s_i \text{ (each feature's score)}$$

Fig. 14

| feature<br><br>Execution order | simple sentence 1_saki ni (first) | simple sentence 1_dakedo (but) | simple sentence 2_yappari (but) | simple sentence 2_mazu (first) | final score |
|---|---|---|---|---|---|
| Simple sentence 1 first | 0.45 | 0.2 | 0.1 | 0.2 | 1.8e-3 |
| Simple sentence 2 first | 0.2 | 0.2 | 0.35 | 0.45 | 6.3e-3 |
| Execute together | 0.05 | 0.2 | 0.15 | 0.05 | 7.5e-5 |
| Simple sentence 1 only | 0.1 | 0.2 | 0.1 | 0.2 | 4.0e-4 |
| Simple sentence 2 only | 0.2 | 0.2 | 0.3 | 0.1 | 1.2e-3 |

Fig. 16

| feature / Execution order | simple sentence 1_node (since) | simple sentence 2_te (conjugative suffix of te-form of verb) | simple sentence 1_saki ni (first) | simple sentence 1_dakedo (but) | simple sentence 2_yappari (but) | simple sentence 2_mazu (first) | simple sentence 1_adding an intermediate destination | simple sentence 2_setting a destination | ... |
|---|---|---|---|---|---|---|---|---|---|
| Simple sentence 1 first | 0.07 | 0.2 | 0.45 | 0.2 | 0.1 | 0.2 | 0.2 | 0.1 | ... |
| Simple sentence 2 first | 0.25 | 0.2 | 0.2 | 0.2 | 0.35 | 0.45 | 0.25 | 0.45 | ... |
| Execute together | 0.03 | 0.2 | 0.05 | 0.2 | 0.15 | 0.05 | 0.2 | 0.05 | ... |
| Simple sentence 1 only | 0.05 | 0.2 | 0.1 | 0.2 | 0.1 | 0.2 | 0.25 | 0.1 | ... |
| Simple sentence 2 only | 0.6 | 0.2 | 0.2 | 0.2 | 0.3 | 0.1 | 0.1 | 0.3 | ... |

Fig. 19

S01: pi-tto nattara ohanashi kudasai
   (Please speak after the beep)
U02: saki ni OO he yotte, ΔΔ he iku
   (I visit OO first, and then go to ΔΔ).
S02: ΔΔ wo mokuteki-chi ni settei shimasu
   (ΔΔ is being set as a destination).
   OO wo keiyu-chi ni tsuika shimasu
   (OO is being added as an intermediate destination).

Fig. 21

| Execution order \ feature | simple sentence 1_saki ni (first) | simple sentence 1_te (and then) | simple sentence 1_adding an intermediate destination | simple sentence 2_setting a destination | final score |
|---|---|---|---|---|---|
| Simple sentence 1 first | 0.45 | 0.2 | 0.2 | 0.1 | 1.8e-3 |
| Simple sentence 2 first | 0.2 | 0.2 | 0.25 | 0.45 | 4.5e-3 |
| Execute together | 0.05 | 0.2 | 0.2 | 0.05 | 1.0e-4 |
| Simple sentence 1 only | 0.1 | 0.2 | 0.25 | 0.1 | 5.0e-4 |
| Simple sentence 2 only | 0.2 | 0.2 | 0.1 | 0.3 | 1.2e-3 |

INTENTION INFERENCE SYSTEM AND INTENTION INFERENCE METHOD

TECHNICAL FIELD

The present disclosure relates to an intention inference system and an intention inference method to execute user-intended operations, recognizing texts input by speech sounds or keyboard or else to infer user's intentions.

BACKGROUND ART

There are known techniques to recognize person's random utterances and to execute operations of machines etc. using the recognized results these days. These techniques are applied to speech-based interfaces in mobile phones and navigation systems. They infer the intentions of the recognition results of input speech sounds, and are capable of processing a wide variety of user's expressions using the intention inference models that are trained by means of statistical methods using a wide variety of corpuses with those corresponding intentions.

These techniques are effective if there is one intention in one utterance. However, they hardly infer multiple intentions accurately when a speaker inputs an utterance like a complex sentence that involves multiple intentions. For example, the utterance "tokyo tower mo yoritai ga, saki ni skytree he yotte (Indeed I want to visit Tokyo Tower, but visit Skytree first)." involves two intentions: one is an intention to set a facility Skytree as an intermediate destination, and the other is an intention to set a facility Tokyo Tower as an intermediate destination. The intention inference models mentioned above have difficulties to infer these two intentions.

For the problem mentioned above, Patent Literature 1, for example, discloses the method of inferring the proper division point for an input text of an utterance which involves multiple intentions by means of intention inference with division-point probabilities of a complex sentence.

CITATION LIST

Patent Literature

Patent Literature 1: Unexamined Japanese Patent Application Publication No. 2000-200273

SUMMARY OF THE INVENTION

Technical Problem

The related art described in Patent Literature 1 just feed outputs of multiple intention inference results on the basis of the division point. It cannot infer the execution order of machine commands corresponding to multiple inferred intensions, which means it cannot find a user's accurate intentions.

The present disclosure is provided to solve the foregoing problem and to provide an intention inference system and an intention inference method which infers user's accurate intentions.

Solution to Problem

An intention inference system according to the present disclosure comprises: a morphological analyzer to perform morphological analysis for a complex sentence with multiple intentions involved; a syntactic analyzer to perform syntactic analysis for the complex sentence morphologically analyzed by the morphological analyzer and to divide it into a first simple sentence and a second simple sentence; an intention inference unit to infer a first intention involved in the first simple sentence and a second intention involved in the second simple sentence; a feature extractor to extract as a first feature a morpheme showing operation execution order included in the first simple sentence and to extract as a second feature a morpheme showing operation execution order included in the second simple sentence; and an execution order inference unit to infer execution order of the first operation corresponding to the first intention and the second operation corresponding to the second intention on the basis of the first feature and the second feature extracted by the feature extractor.

An intention inference method according to the present disclosure comprises: a step of performing morphological analysis for a complex sentence with multiple intentions involved; a step of performing syntactic analysis for the morphologically analyzed complex sentence and dividing it into multiple simple sentences; a step of inferring intentions involved in each of the multiple simple sentences; a step of extracting as a feature a morpheme showing operation execution order included in each of the multiple simple sentences; and a step of inferring the execution order of operations corresponding to intentions involved in each of the multiple simple sentences on the basis of features included in each of the multiple simple sentences.

Advantageous Effects of the Invention

It is possible for the intention inference system and the intention inference method of the present disclosure to infer user's intentions accurately since it infers the execution order of the operations corresponding to the intentions on the basis of the features extracted from the simple sentences.

BRIEF DESCRIPTION OF THE DRAWINGS

FIG. 2 shows an example of an intention inference model of Embodiment 1.

FIG. 3 shows an example of a feature extraction rule of Embodiment 1.

FIG. 4 shows an example of execution order types of Embodiment 1.

FIG. 8 shows exemplary training data of Embodiment 1.

FIG. 9 is a flowchart to show a generation process of an execution order inference model of Embodiment 1.

FIG. 10 shows an exemplary dialogue of Embodiment 1.

FIG. 12 shows the scores of each feature for each execution order type of Embodiment 1.

FIG. 13 shows a calculation formula of Embodiment 1 to obtain the product of the scores.

FIG. 14 shows the final scores for each execution order type of Embodiment 1.

FIG. 16 shows an example of an execution order inference model of Embodiment 2.

FIG. 19 shows an exemplary dialogue of Embodiment 2.

FIG. 21 shows the final scores for each execution order type of Embodiment 2.

DESCRIPTION OF EMBODIMENTS

Embodiment 1

Embodiment 1 of the present disclosure is described below by reference to the drawings.

Figure 1:
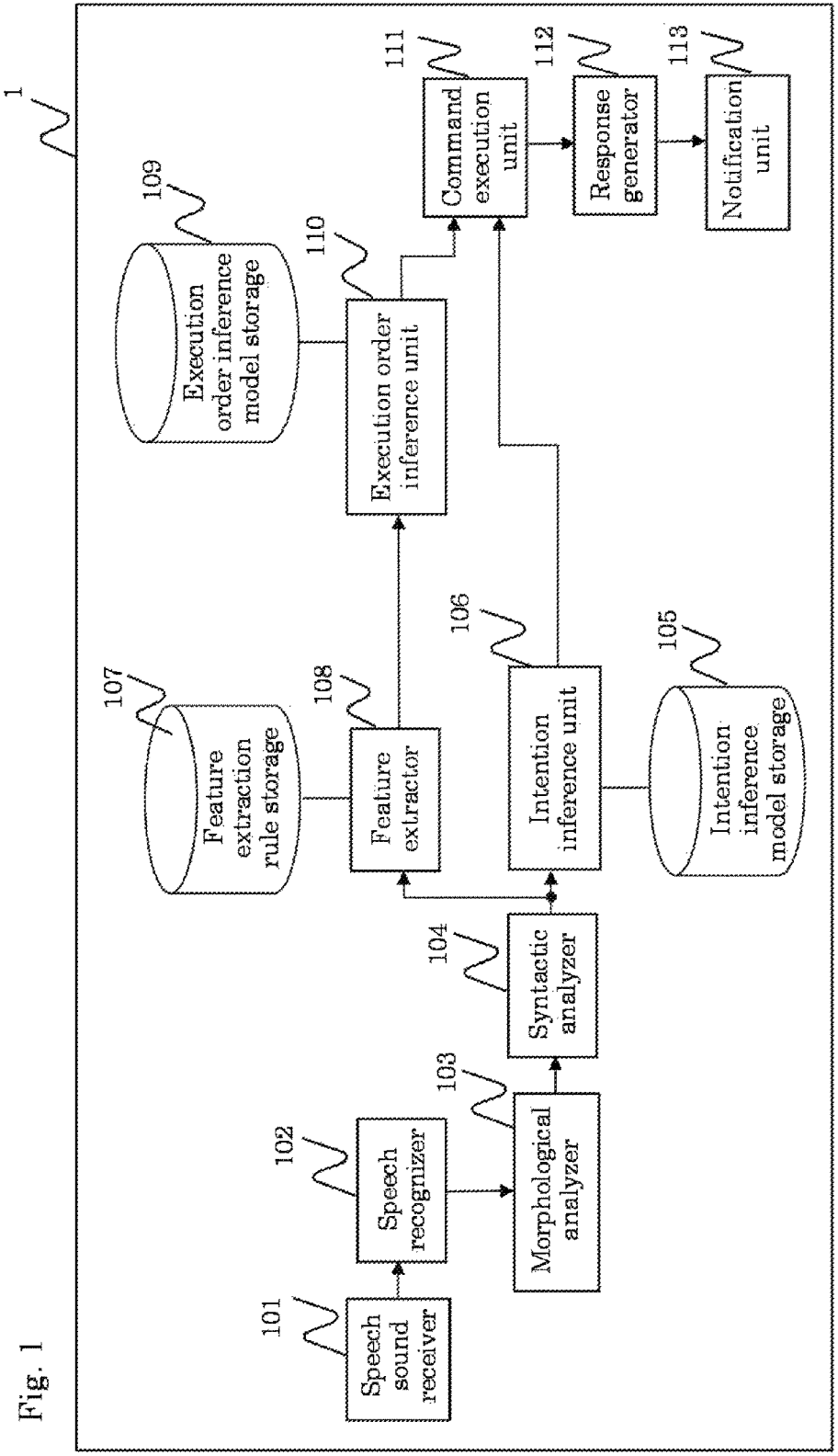
FIG. 1 shows an exemplary configuration of an intention inference system 1 of Embodiment 1.

FIG. 1 shows an exemplary configuration of an intention inference system 1 of Embodiment 1. The intention inference system 1 includes: a speech sound receiver 101, a speech recognizer 102, a morphological analyzer 103, a syntactic analyzer 104, an intention inference model storage 105, an intention inference unit 106, a feature extraction rule storage (a feature extraction condition storage) 107, a feature extractor 108, an execution order inference model storage (an execution order inference information storage) 109, an execution order inference unit (an execution order determiner) 110, a command execution unit (an operation execution unit) 111, a response generator 112, and a notification unit 113.

The speech sound receiver 101 accepts a speech sound input.

The speech recognizer 102 recognizes speech sound data corresponding to speech sound input through the speech sound receiver 101, converts it into text data, and passes it to the morphological analyzer 103. In the following description, the text data is assumed to be a complex sentence that involves multiple intentions, where the complex sentence consists of multiple simple sentences, and each simple sentence has one intention.

The morphological analyzer 103 performs a morphological analysis of the text data converted by the speech recognizer 102, and passes the results to the syntactic analyzer 104, where the morphological analysis is a step in the natural language processing. In the morphological analysis, the text is segmented into morphemes (the minimal meaning-bearing units in a language), and each morpheme's part of speech is identified in accordance with dictionaries. For example, a simple sentence "tokyo tower he iku (I go to Tokyo Tower)" is segmented into morphemes like "tokyo tower/Proper noun"+"he (to)/Motion target particle"+"iku (go)/Verb". A morpheme is sometimes called an independent word or a feature.

The syntactic analyzer 104 analyzes (performs syntactic analysis of) the sentence structure of the text data morphologically analyzed by the morphological analyzer 103 on the basis of the grammatical rules, where the analysis is performed bunsetsu by bunsetsu, or phrase by phrase. When a text in the text data is a complex sentence that involves multiple intentions, the syntactic analyzer 104 divides it into multiple simple sentences and passes the morphological analysis results for each simple sentence to the intention inference unit 106 and to the feature extractor 108. It is possible, for example, to employ the CYK (Cocke-Younger-Kasami) algorithm etc. for the syntactic analysis method.

Though a text (complex sentence) includes two sentences, each of which is called a simple sentence 1 and a simple sentence 2, in the following description, it is not a limitation, and the complex sentence can include three or more simple sentences. The syntactic analyzer 104 need not pass all the data corresponding to each of the divided simple sentences to the intention inference unit 106 and to the feature extractor 108. It is possible, for example, to pass only the results of a simple sentence 1 and a simple sentence 2 even though an input text (complex sentence) includes a simple sentence 1, a simple sentence 2, and a simple sentence 3.

The intention inference model storage 105 stores intention inference models to perform an intention inference with morphemes as features. An intention can be represented by the form of "<top-level intention> [<slot name>=<slot value>, ... ]", where a top-level intention is for representing a classification or a function of an intention. In an example of a navigation system, a top-level intention corresponds to an upper level machine command, such as setting a destination or listening music, which a user operates first. A slot name and a slot value represent required information to execute the top-level intention. For example, an intention involved in a simple sentence "mokuteki-chi wo tokyo tower ni settei suru (I set Tokyo Tower as a destination)" is represented by the form of "<setting a destination> [<facility>=<Tokyo Tower>]", and an intention involved in a simple sentence "mokuteki-chi wo settei shitai (I want to set a destination)" is represented by the form of "<setting a destination> [<facility>=<NULL>]". In the latter case, a destination setting procedure is performed with no specific facility name of the destination.

FIG. 2 shows an example of an intention inference model of Embodiment 1. As FIG. 2 shows, the intention inference model represents each morpheme's score for the intentions, such as "setting a destination [{facility=Tokyo Tower}]" and "setting an intermediate destination [{facility=Tokyo Tower}]". As FIG. 2 shows, the scores of the morphemes "iku (go)" and "mokuteki-chi (final destination)" are high for the intention "setting a destination [{facility=Tokyo Tower}]" since those morphemes are likely to mean an intention of setting a final destination, while the score of the morpheme "keiyu-chi (intermediate destination)" is high for the intention "setting an intermediate destination [{facility=Tokyo Tower}]" since that morpheme is likely to mean an intention of setting an intermediate destination.

The intention inference unit 106 infers intentions involved in each multiple simple sentence using the intention inference model on the basis of the morphological analysis results of the multiple simple sentences entering from the syntactic analyzer 104 to pass the results to the command execution unit 111. One of the available intention inference method here is, for example, the maximum entropy method. This means the intention inference unit 106 estimates the degree of likelihood of an intention for an input morpheme using the statistical method based on a large collection of morpheme-intention pairs.

The feature extraction rule storage 107 stores a feature extraction rule (a feature extraction condition) that is a rule to extract morphemes in the simple sentences as features, where the morphemes are used to determine execution order.

FIG. 3 shows an example of a feature extraction rule of Embodiment 1. As it shows, a feature extraction rule includes several sets of an occurring-location condition and a part-of-speech condition. An occurring-location condition represents an occurring location, such as the beginning of a sentence or the end of a sentence, of a morpheme in a simple sentence, while a part-of-speech condition represents a part of speech of the morpheme that exists at that occurring location. Hence FIG. 3 means, if the part of speech of a morpheme occurring at the beginning of a simple sentence is a time representing noun plus a "kaku-joshi" (i.e., a particle used with noun or the like), the morpheme is extracted as a feature. If the part of speech of a morpheme occurring at the end of a simple sentence is a "setsuzoku-joshi" (i.e., a particle that has conjunctive meaning and which includes conjugative suffix "te" of te-form of verb, conditional form suffix "ba", and Japanese grammar "node", etc. in Japanese grammar for Japanese natives), the morpheme is extracted as a feature.

The feature extractor 108 extracts, as features, morphemes that represent the execution order of operations involved in the simple sentences using the feature extraction rule on the basis of the morphological analysis results of the multiple simple sentences entering from the syntactic analyzer 104, which means the feature extractor 108 extracts each feature on the basis of a location and a part of speech of the morpheme in the multiple simple sentences. For an exemplary simple sentence "saki ni tokyo tower he iku (I go to Tokyo Tower first)", the morphological analyzer 103 performs morphological analysis of it as "saki ni (first)/Time representing noun plus "kaku-joshi""+"tokyo tower/Proper noun"+"he/"kaku-joshi""+"iku/Verb". In these, since the morpheme "saki ni" consists of a time representing noun and a "kaku-joshi", the feature extractor 108 extracts the morpheme "saki ni" as a feature in accordance with the feature extraction rule shown in FIG. 3. After that, the feature extractor 108 passes the extracted feature to the execution order inference unit 110.

The execution order inference model storage 109 stores an execution order inference model (execution order inference information) to infer the execution order of the multiple simple sentences included in the text.

FIG. 4 shows an example of execution order types of Embodiment 1. As it shows, execution order of multiple simple sentences means the order of execution of operations corresponding to the intentions of the simple sentences. When a text includes a simple sentence 1 and a simple sentence 2, for example, the type of their execution order is classified into: executing a simple sentence 1 first (No. 1, Simple sentence 1 first), executing a simple sentence 2 first (No. 2, Simple sentence 2 first), executing a simple sentence 1 and a simple sentence 2 at the same time (No. 3, Execute together), executing only a simple sentence 1 (No. 4, Simple sentence 1 only), and executing only a simple sentence 2 (No. 5, Simple sentence 2 only).

Figures 5, 6:
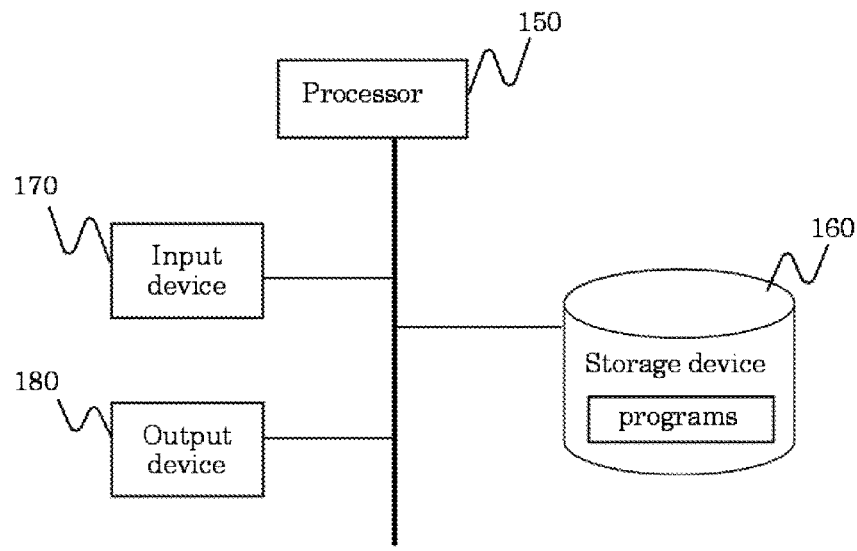
FIG. 5 shows an example of an execution order inference model of Embodiment 1.
FIG. 6 shows an exemplary hardware configuration of an intention inference system 1 of Embodiment 1.

FIG. 5 shows an example of the execution order inference model of Embodiment 1. As it shows, the execution order inference model includes information (execution order information) that shows the scores of the features included in each of the multiple simple sentences for each of the types of the execution order of operations corresponding to the intentions of the multiple simple sentences. When the simple sentence 1 includes a feature "node" (since), for example, its score for "Simple sentence 1 first" is 0.07, its score for "Simple sentence 2 first" is 0.25, its score for "Execute together" is 0.03, its score for "Simple sentence 1 only" is 0.05, and its score for "Simple sentence 2 only" is 0.6. One possible way to define these score values is a calculation by software depending on the substance of the features, while a user can set some appropriate values for them. When the simple sentence 1 includes a feature "node" like an example above, the intention involved in the simple sentence 2, which is followed by the simple sentence 1, is most likely to be executed, so that the score for "Simple sentence 2 only" is the highest and the score for "Simple sentence 2 first" is the second highest. When the simple sentence 2 includes a feature "te" (one of "setsuzoku-joshi", or conjugative suffix of te-form of verb, which has conjunctive meaning), its score for "Simple sentence 1 first" is 0.2, its score for "Simple sentence 2 first" is 0.2, its score for "Execute together" is 0.2, its score for "Simple sentence 1 only" is 0.2, and its score for "Simple sentence 2 only" is 0.2. It is the same for other features "saki ni", "dakedo" (but), "yappari" (but), "mazu" (first) shown in FIG. 5 that scores are given to them.

The execution order inference unit 110 infers the execution order of operations corresponding to the intentions involved in the multiple simple sentences on the basis of the features of each simple sentence extracted by the feature extractor 108. When a text "tokyo tower mo yoritai ga, saki ni skytree he yotte." enters, for example, it infers the execution order as "Simple sentence 2 first" using the feature of the simple sentence 1 "tokyo tower mo yoritai ga (Indeed I want to visit Tokyo Tower)" and the features of the simple sentence 2 "saki ni skytree he yotte (but visit Skytree first)". Details of the execution order inference algorithm are described later.

The command execution unit 111 executes machine commands (operations) corresponding to the intentions involved in the multiple simple sentences on the basis of the operation execution order inferred by the execution order inference unit 110 and on the basis of each intention involved in the multiple simple sentences inferred by the intention inference unit 106. When a text "tokyo tower mo yoritai ga, saki ni skytree he yotte." enters, for example, the intention inference unit 106 passes it the intention "<setting an intermediate destination> [<facility>=<Tokyo Tower>]" of the simple sentence 1 and the intention "<setting an intermediate destination>[<facility>=<Skytree>]" of the simple sentence 2. In addition, the execution order inference unit 110 passes it the execution order of "Simple sentence 2 first". Then the command execution unit 111 executes a machine command corresponding to the intention of the simple sentence 2 (an operation of setting Skytree as an intermediate destination) first, and then executes a machine command corresponding to the intention of the simple sentence 1 (an operation of setting Tokyo Tower as an intermediate destination).

The response generator 112 generates a response message corresponding to the machine command executed by the command execution unit 111. It is possible to generate the response message in text data format or to generate it as voice data for a synthesized sound. When it generates voice data, a possible example is for a synthesized sound like "skytree wo keiyu-chi ni settei shimasu (Skytree is being set as an intermediate destination). tokyo tower wo keiyu-chi ni settei shimasu (Tokyo Tower is being set as an intermediate destination)."

The notification unit 113 notifies a user such as a driver of the response message generated by the response generator 112, which means the notification unit 113 notifies the user that the command execution unit 111 has executed the multiple machine commands. The possible way of notification is every way that the user can understand, such as a text or image display, a voice output, or vibrations.

The hardware configuration of the intention inference system 1 is described next.

FIG. 6 shows an exemplary hardware configuration of the intention inference system 1 of Embodiment 1. The intention inference system 1 includes a processor 150, such as a CPU (Central processing unit), a storage device (memory) 160, such as a ROM (Read only memory) or a hard disk drive, an input device 170, such as a keyboard or a microphone, and an output device 180, such as a loudspeaker or a display, all of these connected to a bus line. It is possible for a CPU to include a memory therein.

The speech sound receiver 101 in FIG. 1 is realized by the input device 170, and the notification unit 113 is realized by the output device 180.

Data etc. to be stored in each of the intention inference model storage 105, the feature extraction rule storage 107, the execution order inference model storage 109, and a training data storage 114, which is described later, is stored in the storage device 160. Components, such as the speech recognizer 102, the morphological analyzer 103, the syntactic analyzer 104, the intention inference unit 106, the feature extractor 108, the execution order inference unit 110, the command execution unit 111, the response generator 112, and an execution order inference model generator 115, which is described later, are also stored as computer programs in the storage device 160.

The processor 150 realizes the functions of the components mentioned above by reading out and executing the programs stored in the storage device 160 properly, which means a combination of hardware, i.e. the storage device 150, and software, i.e. the programs mentioned above, realizes the functions of the components mentioned above. Though the exemplary configuration of FIG. 6 includes one processor 150 to realize the functions, it is possible for multiple processors to realize the functions, for example, by employing processors in external servers for some part of the functions, which means "a processor", or the processor 150 in the invention is an idea that includes multiple processors, not limited to one processor. The way to realize the functions of these components is not construed to be limited to a combination of hardware and software: it is possible for only hardware to realize them. One of those ways is to use what we call a system LSI, i.e., to pre-write above programs into the processor 150. Thus we can call it a Processing Circuitry: it is an upper level idea that includes both of hardware-software combination and hardware alone.

Followings are the description of the operation of the intention inference system 1 of Embodiment 1. First, the operations of the generation process of the execution order inference model are described.

Figure 7:
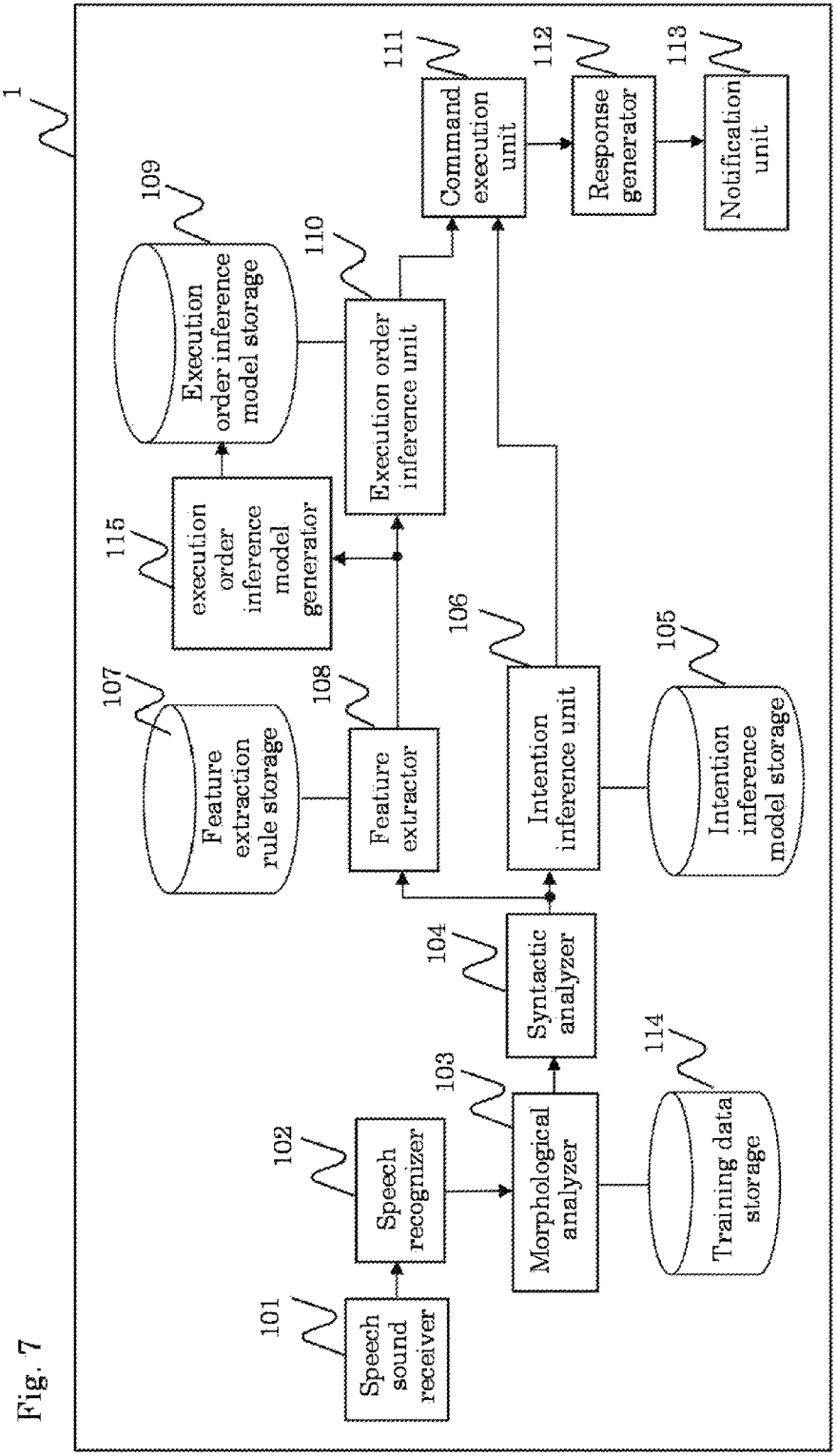
FIG. 7 shows an exemplary configuration of an intention inference system 1 to show a generation process of an execution order inference model of Embodiment 1.

FIG. 7 shows an exemplary configuration of the intention inference system 1 to describe a generation process of the execution order inference model of Embodiment 1.

The training data storage 114 in FIG. 7 stores the training data of multiple exemplary sentences with their execution order.

FIG. 8 shows an example of the training data of Embodiment 1. As it shows, the training data is the data of multiple exemplary sentences, No. 1, No. 2. No. 3, and so on, with their execution order. For example, exemplary sentence No. 1 "jikan ga kibishii node, kohsoku-dohro de itte (Since my schedule is tight, go along a highway)" is divided into a simple sentence 1 "jikan ga kibishii node (Since my schedule is tight)" and a simple sentence 2 "kohsoku-dohro de itte (go along a highway)" with execution order "Simple sentence 2 only". The execution order is provided by a training data maker in advance.

Back to FIG. 7, the execution order inference model generator 115 learns in a statistical way how to choose the execution order for each typical complex sentence using a table including them stored in the training data storage 114.

The execution order inference model generator 115 generates the execution order inference model using the features extracted by the feature extractor 108 and the execution order stored in the training data storage 114.

FIG. 9 is a flowchart to show a generation process of the execution order inference model of Embodiment 1. First, the morphological analyzer 103 performs morphological analysis for the simple sentence 1 and the simple sentence 2 in each of the exemplary sentences in the training data stored in the training data storage 114 (step ST1). For example, the morphological analyzer 103 performs morphological analysis for the simple sentence 1 "jikan ga kibishii node" and the simple sentence 2 "kohsoku-dohro de itte" in the exemplary sentence No. 1. The morphological analyzer 103 passes the morphologically analyzed results to the feature extractor 108 via the syntactic analyzer 104.

The feature extractor 108 performs feature extraction processing for the morphologically analyzed simple sentence 1 and simple sentence 2 on the basis of the feature extraction rule stored in the feature extraction rule storage 107 (step ST2). For example, the feature extractor 108 extracts a feature "node" and a feature "te" (one of "setsuzoku-joshi", or conjugative suffix of te-form of verb, a part of "itte" {go}) from the exemplary sentence No. 1. The feature extractor 108 also adds simple sentence number information to each of the extracted features (step ST3). For example, the feature extractor 108 adds simple sentence number information "simple sentence 1" to the feature "node" extracted from the simple sentence 1 to obtain a form "simple sentence 1_node", while it adds simple sentence number information "simple sentence 2" to the feature "te" extracted from the simple sentence 2 to obtain a form "simple sentence 2_te". The feature which the simple sentence number information is added to may be called the feature with simple sentence number information. The feature extractor 108 passes information on the extracted feature to the execution order inference model generator 115.

The execution order inference model generator 115 generates the execution order inference model on the basis of the execution order included in the training data and the features (step ST4). For example, since execution order included in the training data is "Simple sentence 2 only" as shown in FIG. 8 for the features "simple sentence 1_node" and "simple sentence 2_te", the execution order inference model generator 115 concludes the score of the feature "simple sentence 2_te" is much higher than that of the feature "simple sentence 1_node". The execution order inference model generator 115 performs the same processing as above for all of the exemplary sentences included in the training data to generate the execution order inference model such as shown in FIG. 5 in the end.

The operation of the intention inference process including the execution order inference model is described next.

Figure 11:
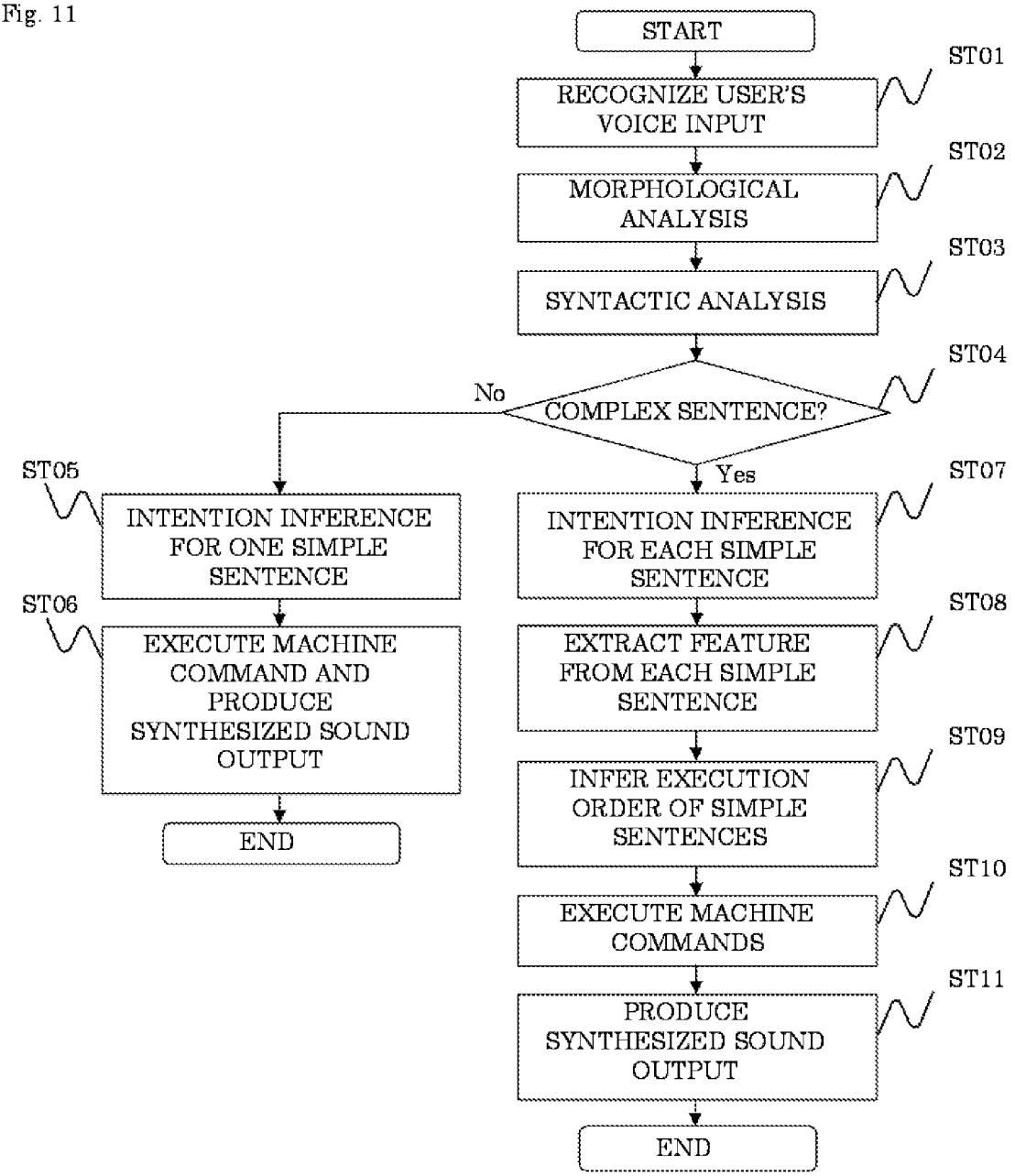
FIG. 11 is a flowchart to show an intention inference process of Embodiment 1.

FIG. 10 shows an exemplary dialogue of Embodiment 1. FIG. 11 is a flowchart to show an intention inference process of Embodiment 1.

First, the intention inference system 1 produces an utterance (S1) "pi-tto nattara ohanashi kudasai (Please speak after the beep)" as shown in FIG. 10. For this, the user produces an utterance (U1) "XX he ikitai (I want to go to XX)". Here the utterance of the intention inference system 1 is denoted as "S", while that of the user as "U", which are the same hereinafter.

When the user produces an utterance like U1, the speech recognizer 102 performs speech recognition (step ST01) in FIG. 11 of the user's input to convert it into text data. The morphological analyzer 103 performs morphological analysis of the converted text data (step ST02). The sytactic analyzer 104 performs syntactic analysis of the morphologically analyzed text data (step ST03): if the text data includes a complex sentence, it divides the complex sentence into multiple simple sentences. If the text data does not include a complex sentence (step ST04—No), the flow goes into the sequence starting at the step ST05, while the step goes to ST07 and the followings if the text data includes a complex sentence (step ST04—Yes).

Since the U1 input is an example of a simple sentence, the step goes to ST05 here. The syntactic analyzer 104, then, passes the morphologically analyzed text data of the simple sentence to the intention inference unit 106. The intention inference unit 106 performs an intention inference (step ST05) of the input simple sentence using the intention inference model: it obtains an intention in the form "<setting a destination> [<facility>=<XX>]" in this example.

The command execution unit 111 executes a machine command (step ST06) corresponding to the intention inference result by the intention inference unit 106. For example, the command execution unit 111 performs the operation of setting a facility XX as a destination, and the response generator 112 generates a synthesized sound corresponding to the machine command executed by the command execution unit 111. A possible example for the synthesized sound is "XX wo mokuteki-chi ni settei shimashita (XX has been set as a destination)". The notification unit 113 notifies the user by the synthesized sound generated by the response generator 112 through a loudspeaker or the like, which means it notifies the user of the message "XX wo mokuteki-chi ni shimashita (XX has been set as a destination)." shown as S2 in FIG. 10.

Next, the operation of the case when the user produces the utterance "saki ni OO he yoritai no dakedo, yappari mazu ΔΔ he yoru (Before that, I want to visit OO, but I visit ΔΔ first)." shown as U2 in FIG. 10 is described.

When the user produces an utterance as U2, the speech recognizer 102 performs a speech recognition (step ST01 in FIG. 11) of the user input to convert it into text data, and the morphological analyzer 103 performs morphological analysis (step ST02 in FIG. 11) of the text data. Next, the sytactic analyzer 104 performs syntactic analysis (step ST103) of the text data, where the text data corresponding to the user's input is divided into multiple simple sentences, such as a simple sentence 1 (the first simple sentence) "saki ni OO he yoritai no dakedo (Before that, I want to visit OO)" and a simple sentence 2 (the second simple sentence) "yappari mazu ΔΔ he yoru (but I visit ΔΔ first)". Then the syntactic analyzer 104 passes morphologically analyzed text data of each of the simple sentences to the intention inference unit 106 and to the feature extractor 108, so that the step goes on to ST07 and the followings.

The intention inference unit 106 performs intention inferences (step ST07) of each of the simple sentence 1 and the simple sentence 2 using the intention inference model. In this example, the intention inference unit 106 infers the intention "<setting an intermediate destination>[<facility>=<OO>]" for the simple sentence 1 and infers the intention "<setting an intermediate destination> [<facility>=<ΔΔ>]" for the simple sentence 2.

The feature extractor 108 performs feature extraction (step ST08) for each of the simple sentence 1 and the simple sentence 2 using the feature extraction rule. In this example, the feature extractor 108 extracts the first features, the features "simple sentence 1_saki ni" and "simple sentence 1_dakedo" for the simple sentence 1, and extracts the second features, the features "simple sentence 2_yappari" and "simple sentence 2_mazu" for the simple sentence 2, where the features here include their simple sentence number information. The feature extractor 108 passes information on the features extracted for each simple sentence to the execution order inference unit 110.

The execution order inference unit 110 infers the execution order of each of the simple sentences (step ST09) on the basis of the information on the features given by the feature extractor 108 and on the basis of the execution order inference model stored in the execution order inference model storage 109. The followings are detailed description on the execution order determination.

First the execution order inference unit 110 obtains the scores of each feature for each type of execution order comparing the features given by the feature extractor 108 with the execution order inference model.

FIG. 12 shows the scores of each feature for each type of execution order of Embodiment 1. For the execution order type "Simple sentence 1 first", the score of the feature "simple sentence 1_saki ni" is 0.45, the score of the feature "simple sentence 1_dakedo" is 0.2, the score of the feature "simple sentence 2_yappari" is 0.1, and the score of the feature "simple sentence 2_mazu" is 0.2, as shown in FIG. 12. For other types of execution order, the scores of each feature are obtained in the same way.

Next, the execution order inference unit 110 obtains the product of the scores of each feature for each type of execution order.

FIG. 13 shows a calculation formula of Embodiment 1 to obtain the product of the scores, where $s_i$ is the score of the i-th feature for the type of execution order to infer and S is a final score to represent a product of the $s_i$s for the type of execution order to infer.

FIG. 14 shows the final scores for each type of execution order of Embodiment 1. The execution order inference unit 110 calculates the final score as shown in FIG. 14 using the calculation formula shown in FIG. 13. In this example, for the execution order type "Simple sentence 1 first", the score of the feature "simple sentence 1_saki ni" is 0.45, the score of the feature "simple sentence 1_dakedo" is 0.2, the score of the feature "simple sentence 2_yappari" is 0.1, and the score of the feature "simple sentence 2_mazu" is 0.2, so that the final score S, which is a product of these, is calculated to be 1.8e-3. For other types of execution order, each final score is calculated in the same way.

The execution order inference unit 110 chooses the execution order "Simple sentence 2 first" which has the highest score as a proper execution order from among the types of execution order to infer with their calculated final scores. This means the execution order inference unit 110 infers the execution order of operations on the basis of the scores of the multiple features included in the execution order inference model. In other words, it infers the execution order of operations on the basis of the final scores obtained as products of the scores of multiple features.

Back to FIG. 11, the command execution unit 111 executes the machine commands (step ST10) corresponding to the intentions involved in each of the multiple simple sentences on the basis of each intention involved in the multiple simple sentences inferred by the intention inference unit 106 and on the basis of the execution order of the multiple simple sentences determined by the execution order inference unit 110.

In this example, the intention inference unit 106 infers an intention "<setting an intermediate destination> [<facility>=<OO>]" for the simple sentence 1 and an intention "<setting an intermediate destination>[<facility>=<ΔΔ>]" for the simple sentence 2, while the execution order inference unit 110 infers the execution order "Simple sentence 2 first" to be proper execution order. Hence the command execution unit 111 executes a machine command (an operation of setting ΔΔ as an intermediate destination) corresponding to the intention "<setting an intermediate destination> [<facility>= <ΔΔ>]" of the simple sentence 2 first, and then executes a machine command (an operation of setting OO as an intermediate destination) corresponding to the intention "<setting an intermediate destination> [<facility>=<OO>]" of the simple sentence 1. The operation corresponding to the first intention may be called the first operation, while the operation corresponding to the second intention may be called the second operation.

The response generator 112 generates a synthesized sound "ΔΔ wo ichi-bamme no keiyu-chi ni tsuika shimasu (ΔΔ is being added as the first intermediate destination). OO wo ni-bamme no keiyu-chi ni tsuika shimasu (OO is being added as the second intermediate destination)." corresponding to the machine commands executed by the command execution unit 111 shown as S3 in FIG. 10, and then the notification unit 113 notifies the user by the synthesized sound (step ST11).

As described above, the syntactic analyzer 104 divides an input complex sentence into multiple simple sentences, the feature extractor 108 extracts features included in each of the multiple simple sentences, and the execution order determiner 110 determines the execution order of operations corresponding to intentions involved in each of the multiple simple sentences on the basis of the extracted features, in Embodiment 1. This enables the system to perform intention inferences based even on their execution order and to infer user's intentions accurately.

In addition, the command execution unit 111 executes machine commands corresponding to the intentions involved in each of the multiple simple sentences on the basis of the execution order of the multiple simple sentences determined by the execution order inference unit 110. This helps the user save their manipulations.

Embodiment 2

Embodiment 2 of the present disclosure is described below by reference to the drawings. In Embodiment 2, the execution order inference unit 110 determines the execution order using the feature of a top-level intention (a top-level intention's feature) obtained from the intention inference unit 106 in addition to the features obtained from the feature extractor 108, where a top-level intention's feature is described later.

Figure 15:
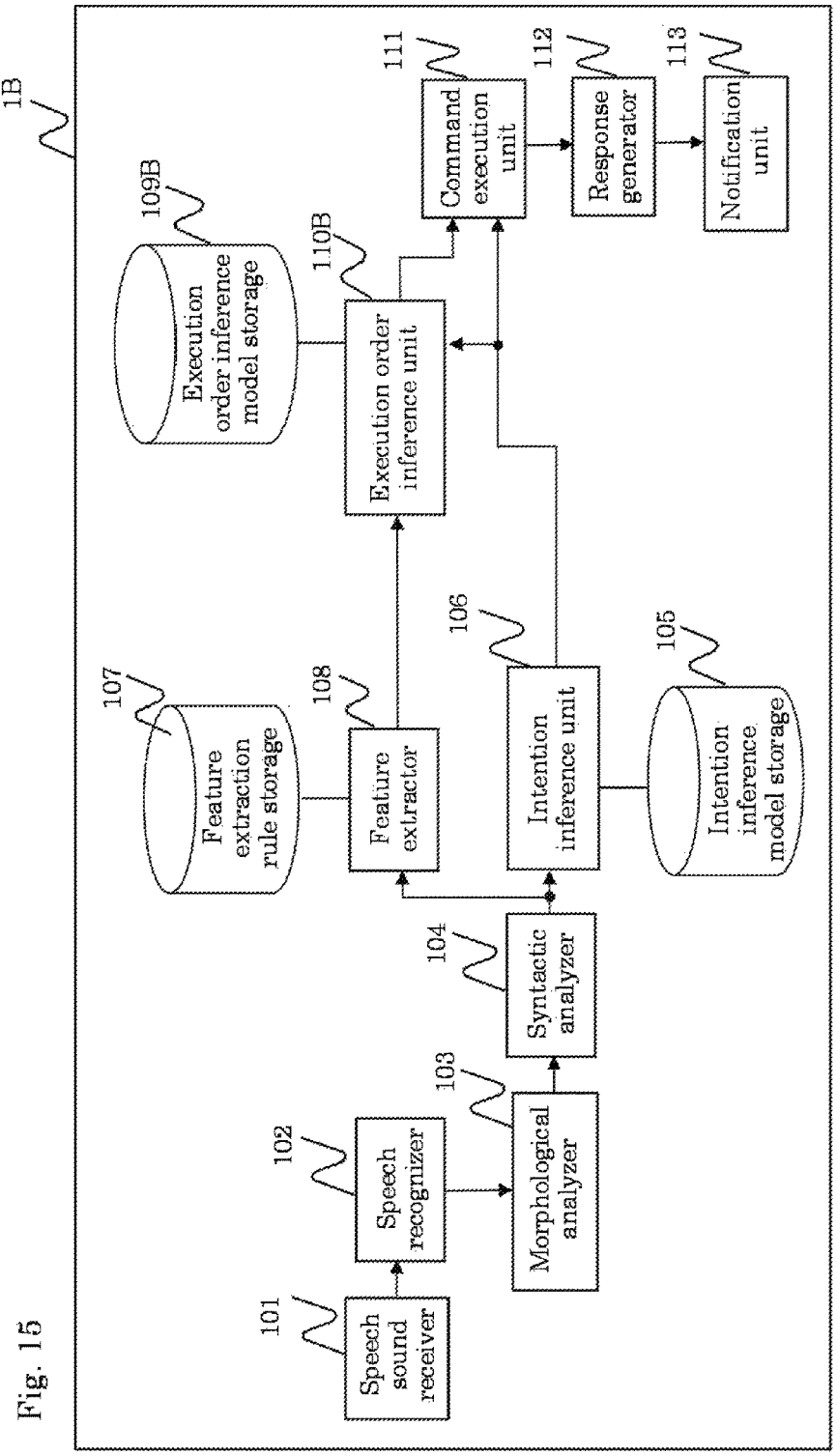
FIG. 15 shows an exemplary configuration of an intention inference system 1B of Embodiment 2.

FIG. 15 shows an exemplary configuration of an intention inference system 1B of Embodiment 2. The intention inference system 1B of Embodiment 2 differs from the intention inference system 1, where the former includes an execution order inference model storage 109B and an execution order inference unit 110B instead of the execution order inference model storage 109 and the execution order inference unit 110 of Embodiment 1. The other components in the configuration are the same as those in Embodiment 1, so that they are labeled the same reference signs as FIG. 1 to omit descriptions.

The execution order inference model storage 109B stores an execution order inference model (execution order inference information) to infer the execution order of the multiple simple sentences included in the text.

FIG. 16 shows an example of an execution order inference model of Embodiment 2. As it shows, the execution order inference model includes information that shows the scores of features included in each of the multiple simple sentences for each of the types of execution order, and also shows the scores of top-level intention's features involved in each of the multiple simple sentences for each of the types of execution order.

In FIG. 16, the scores of the feature "simple sentence 1_node", the feature "simple sentence 2_te", the feature "simple sentence 1_saki ni", the feature "simple sentence 1_dakedo", the feature "simple sentence 2_yappari", and the feature "simple sentence 2_mazu" are the same as Embodiment 1, so that another description is omitted.

In FIG. 16, a feature "simple sentence 1_adding an intermediate destination" and a feature "simple sentence 2_setting a destination" are top-level intentions' features. A top-level intention's feature is a top-level intention with its simple sentence number information extracted as intention inference result by the intention inference unit 106. For example, the "simple sentence 1_adding an intermediate destination" means an intention involved in the simple sentence 1 is "adding an intermediate destination", while the "simple sentence 2_setting a destination" means an intention involved in the simple sentence 2 is "setting a destination".

In exemplary FIG. 16, the score of the top-level intention's feature "simple sentence 1_adding an intermediate destination" for the execution order "Simple sentence 1 first" is 0.2, the score for the execution order "Simple sentence 2 first" is 0.25, the score for the execution order "Execute together" is 0.2, the score for the execution order "Simple sentence 1 only" is 0.25, and the score for the execution order "Simple sentence 2 only" is 0.1, while the score of the top-level intention's feature "simple sentence 2_setting a destination" for the execution order "Simple sentence 1 first" is 0.1, the score for the execution order "Simple sentence 2 first" is 0.45, the score for the execution order "Execute together" is 0.05, the score for the execution order "Simple sentence 1 only" is 0.1, and the score for the execution order "Simple sentence 2 only" is 0.3. Since a navigation system usually sets a final destination first and then sets an intermediate destination when setting the final destination and the intermediate destination, the score of the top-level intention's feature "simple sentence 2_setting a destination" for the execution order "Simple sentence 2 first" is large.

Followings are the description of the operation of the intention inference system 1B of Embodiment 2. First, the operations of the generation process of the execution order inference model are described.

Figure 17:
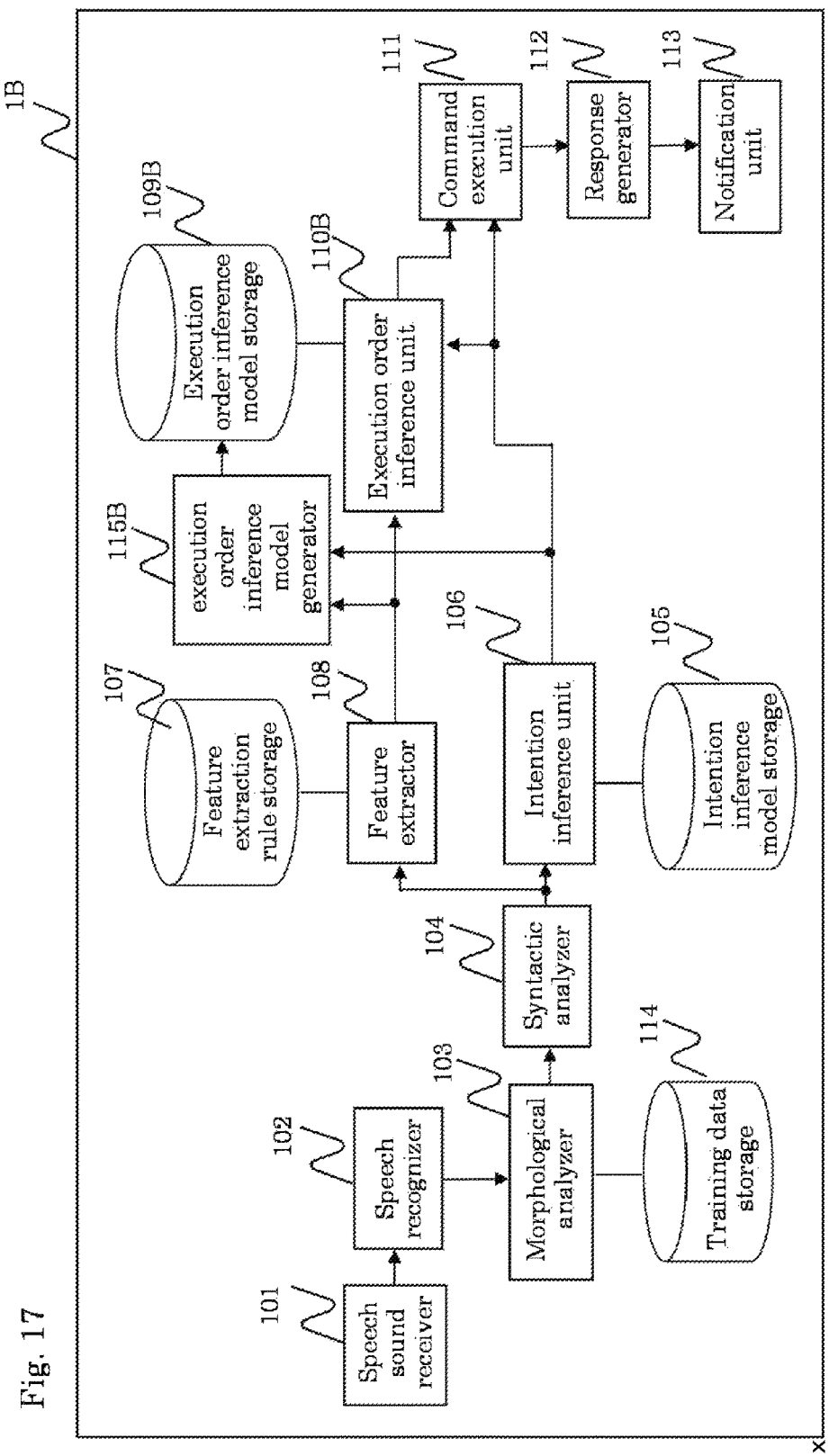
FIG. 17 shows an exemplary configuration of an intention inference system 1B to show a generation process of an execution order inference model of Embodiment 2.
Figure 18:
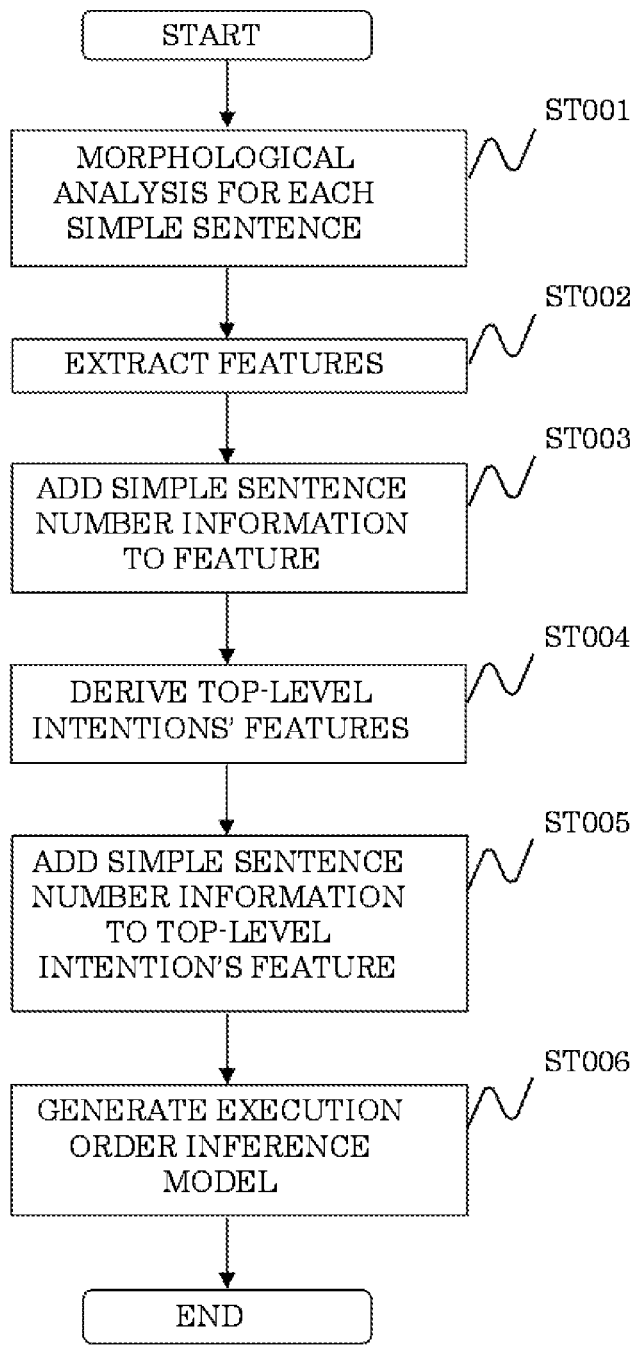
FIG. 18 is a flowchart to show a generation process of an execution order inference model of Embodiment 2.

FIG. 17 shows an exemplary configuration of the intention inference system 1B to show a generation process of the execution order inference model of Embodiment 2. FIG. 18 is a flowchart to show a generation process of an execution order inference model of Embodiment 2.

First, the morphological analyzer 103 performs morphological analysis for the simple sentence 1 and the simple sentence 2 of each of exemplary sentences in the training data shown in FIG. 8 (step ST001). For example, the morphological analyzer 103 performs morphological analysis for the simple sentence 1 "jikan ga kibishii node" and the simple sentence 2 "kohsoku-dohro de itte" of the exemplary sentence No. 1. The morphological analyzer 103 passes the morphologically analyzed results to the feature extractor 108 and to the intention inference unit 106 via the syntactic analyzer 104.

The feature extractor 108 performs feature extraction processing for the morphologically analyzed simple sentence 1 and simple sentence 2 on the basis of the feature extraction rule stored in the feature extraction rule storage 107 (step ST002). For example, the feature extractor 108 extracts a feature "node" and a feature "te" from the exemplary sentence No. 1. The feature extractor 108 also adds simple sentence number information to each of the extracted features (step ST003). For example, the feature extractor 108 adds simple sentence number information "simple sentence 1" to the feature "node" extracted from the simple sentence 1 to obtain a form "simple sentence 1_node", while the feature extractor 108 adds simple sentence number information "simple sentence 2" to the feature "te" extracted from the simple sentence 2 to obtain a form "simple sentence 2_te". The feature extractor 108 passes information on the extracted features to the execution order inference model generator 115B.

Then the intention inference unit 106 infers intentions involved in the morphologically analyzed simple sentence 1 and simple sentence 2 to derive them as top-level intentions' features (step ST004). For exemplary sentence No. 4, the intention inference unit 106 extracts a top-level intention's feature "setting an intermediate destination" from the simple sentence 1 and extracts a top-level intention's feature "setting a destination" from the simple sentence 2, for example. The intention inference unit 106 also adds simple sentence number information to the top-level intention's feature extracted (step ST005). For example, the intention inference unit 106 adds simple sentence number information "simple sentence 1" to the top-level intention's feature extracted from the simple sentence 1 to obtain a form "simple sentence 1_setting an intermediate destination", while the intention inference unit 106 adds simple sentence number information "simple sentence 2" to the top-level intention's feature extracted from the simple sentence 2 to obtain a form "simple sentence 2_setting a destination". The intention inference unit 106 passes information on the extracted features to the execution order inference model generator 115B.

The execution order inference model generator 115B generates the execution order inference model on the basis of the execution order included in the training data, the features and the top-level intentions' features (step ST006). The execution order inference model generator 115B performs the same processing as above for all of the exemplary sentences included in the training data to generate the execution order inference model such as shown in FIG. 16 in the end.

The operation of the intention inference process including the execution order inference model is described next.

Figure 20:
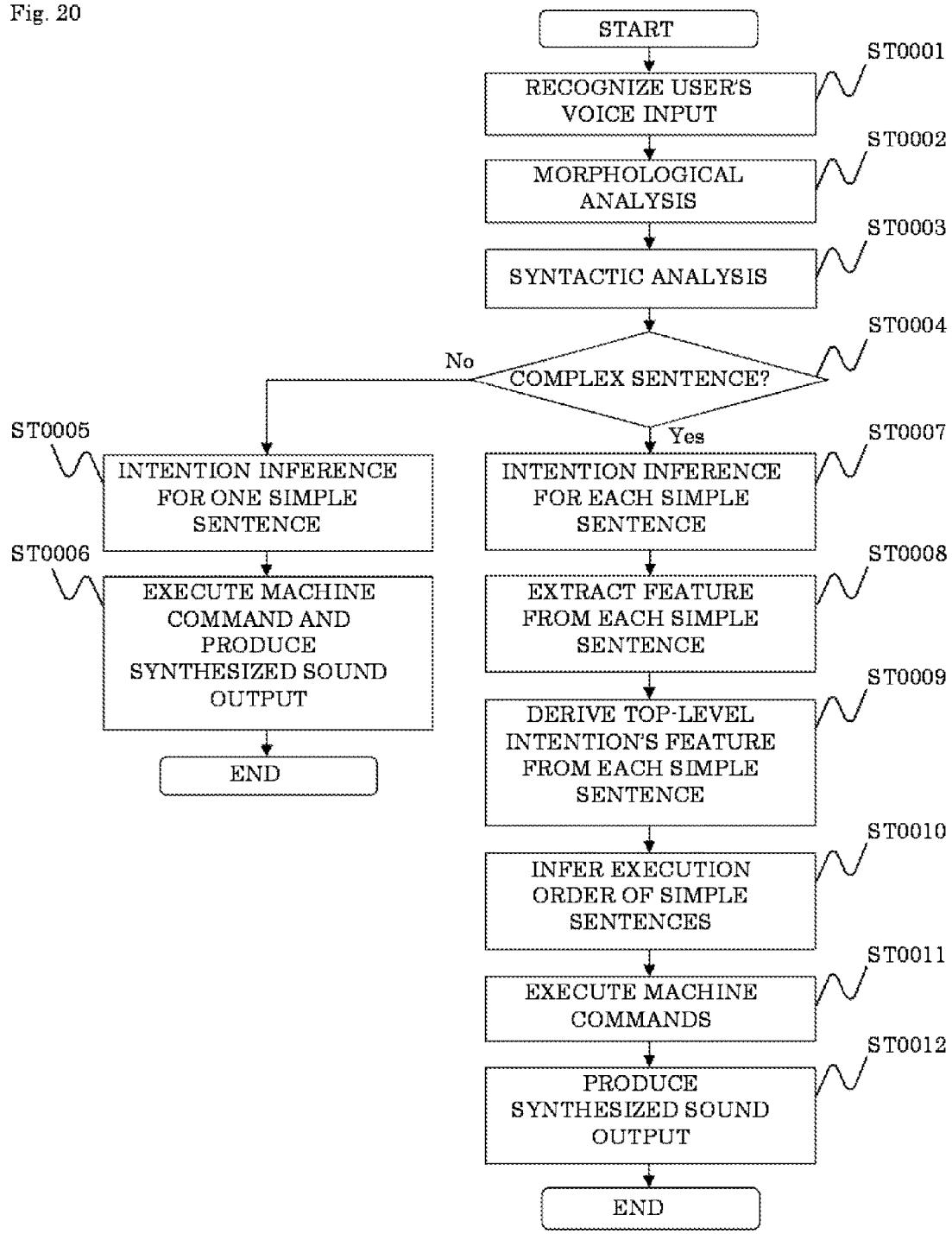
FIG. 20 is a flowchart to show an intention inference process of Embodiment 2.

FIG. 19 shows an exemplary dialogue of Embodiment 2. FIG. 20 is a flowchart to show an intention inference process of Embodiment 2.

The intention inference system 1B produces an utterance (S01) "pi-tto nattara ohanashi kudasai" as shown in FIG. 19. For this, the user produces an utterance (U02) "saki ni OO he yotte, ΔΔ he iku (I visit OO first, and then go to ΔΔ)".

First, the speech recognizer 102 performs speech recognition of the user's input to convert it into text data (step ST0001), and the morphological analyzer 103 performs morphological analysis of the text data (step ST0002). Then the syntactic analyzer 104 performs syntactic analysis of the text data (step ST0003), and it divides the text data came from the user's input into multiple simple sentences, such as a simple sentence 1 (the first simple sentence) "saki ni OO he yotte (I visit OO first)" and a simple sentence 2 (the second simple sentence) "ΔΔ he iku (and then go to ΔΔ)". The syntactic analyzer 104 passes the morphologically analyzed text data of each simple sentence to the intention inference unit 106 and to the feature extractor 108 for the step ST0007 and the following steps to be processed. The step ST0005 and the step ST0006 are processed in the same way as in FIG. 11 of Embodiment 1, so that another description is avoided.

The intention inference unit 106 performs intention inferences (step ST0007) of each of the simple sentence 1 and the simple sentence 2 using the intention inference model. In this example, the intention inference unit 106 infers the intention "<setting an intermediate destination>[<facility>=<OO>]" for the simple sentence 1 and infers the intention "<setting a destination> [<facility>=<ΔΔ>]" for the simple sentence 2.

The feature extractor 108 performs feature extraction (step ST0008) of each of the simple sentence 1 and the simple sentence 2 using the feature extraction rule. In this example, the feature extractor 108 extracts features "simple sentence 1_saki ni" and "simple sentence 1_te" (where "te" is a conjugative suffix of te-form of verb, or a part of "yotte" which means "go, and then" of text U02 in FIG. 19,) for the simple sentence 1, while it extracts no feature for the simple sentence 2. The features include their simple sentence number information. The feature extractor 108 passes information on the features extracted for each simple sentence to the execution order inference unit 110B.

The execution order inference unit 110B derives top-level intentions' features (step ST0009) from the intentions of each simple sentence inferred by the intention inference unit 106. For example, the execution order inference unit 110B derives a top-level intention's feature "simple sentence 1_setting an intermediate destination" from the intention "<setting an intermediate destination> [<facility>=<OO>]" of the simple sentence 1, while it derives a top-level intention's feature "simple sentence 2_setting a destination" from the intention "<setting a destination> [<facility>=<ΔΔ>]" of the simple sentence 2. The top-level intentions' features include their simple sentence number information. Although the example here describes the case that the execution order inference unit 110B derives a top-level intention's feature, this is not a limitation; it is possible, for example, for the intention inference unit 106 to play a roll of deriving a top-level intention's feature and of passing the derived information to the execution order inference unit 110B.

The execution order inference unit 110B infers the execution order of operations corresponding to the intentions of each of the simple sentences (step ST0010) on the basis of the information on the features given by the feature extractor 108 and on the basis of the information on the derived top-level intentions' features. The execution order inference unit 110B obtains the scores of the features and the top-level intentions' features for each type of execution order comparing the features and the top-level intentions' features with the execution order inference model the same as Embodiment 1. Next, the execution order inference unit 110B obtains the product of the scores of the features and the top-level intentions' features for each type of execution order using the calculation formula shown in FIG. 13. This means the execution order inference unit 110B infers the execution order of the operations on the basis of the final scores obtained as products of the scores of the multiple features included in each of the simple sentences and the scores of the top-level intentions' features.

FIG. 21 shows the final scores for each type of execution order of Embodiment 2. In this example, for the execution order type "Simple sentence 1 first", the score of the feature "simple sentence 1_saki ni" is 0.45, the score of the feature "simple sentence 1_te" is 0.2, the score of the top-level intention's feature "simple sentence 1_adding an intermediate destination" is 0.2, and the score of the top-level intention's feature "simple sentence 2_setting a destination" is 0.1, so that the final score S, which is a product of these, is calculated to be 1.8e-3. For other types of execution order, each final score is calculated in the same way.

The execution order inference unit 110B chooses the execution order "Simple sentence 2 first" which has the highest score as a proper execution order from among the types of execution order to infer with their calculated final scores.

Back to FIG. 20, the command execution unit 111 executes the machine commands (step ST0011) corresponding to the intentions involved in each of the multiple simple sentences on the basis of each intention involved in the multiple simple sentences inferred by the intention inference unit 106 and on the basis of the execution order of the multiple simple sentences determined by the execution order inference unit 110B.

In this example, the intention inference unit 106 infers an intention "<setting an intermediate destination>[<facility>=<OO>]" for the simple sentence 1 and infers an intention "<setting a destination>[<facility>=<ΔΔ>]" for the simple sentence 2, while the execution order inference unit 110B infers the execution order "Simple sentence 2 first" to be proper execution order. Hence the command execution unit 111 executes a machine command (an operation of setting ΔΔ as a destination) corresponding to the intention "<setting a destination>[<facility>=<ΔΔ>]" of the simple sentence 2 first, and then executes a machine command (an operation of setting OO as an intermediate destination) corresponding to the intention "<setting an intermediate destination>[<facility>=<OO>]" of the simple sentence 1.

The response generator 112 generates a synthesized sound "ΔΔ wo mokuteki-chi ni settei shimasu (ΔΔ is being set as a destination). OO wo keiyu-chi ni tsuika shimasu (OO is being added as an intermediate destination)." corresponding to the machine commands executed by the command execution unit 111 shown as S02 in FIG. 19, and then the notification unit 113 notifies the user by the synthesized sound (step ST0012).

As described above, the execution order inference unit 110B infers the execution order of operations corresponding to intentions involved in each of multiple simple sentences using features extracted by the feature extractor 108, and also using top-level intentions' features given by the intention inference unit 106, in Embodiment 2. This enables the system to perform user's intention inferences more accurately compared to Embodiment 1.

For example, when the utterance like "saki ni OO he yotte, ΔΔ ni iku (I visit OO first, and then go to ΔΔ)." mentioned above is produced, the final score of "Simple sentence 1 first" is the highest since there remain only the features "simple sentence 1_saki ni" and "simple sentence 1_te" in FIG. 21 without using top-level intentions' features for the execution order determination by the execution order inference unit 110 as in Embodiment 1. This makes the system try to execute a machine command (an operation of setting OO as an intermediate destination) corresponding to the intention "<setting an intermediate destination> [<facility>=<OO>]" of the simple sentence 1 first, and then to execute a machine command (an operation of setting ΔΔ as a destination) corresponding to the intention "<setting a destination> [<facility>=<ΔΔ>]" of the simple sentence 2.

However, navigation systems usually need to perform a setting operation of a final destination before performing a setting operation of an intermediate destination. Then the system cannot execute machine commands properly for the utterance "saki ni OO he yotte, ΔΔ ni iku.", so that it cannot infer user's intentions accurately in Embodiment 1.

On the other hand, the execution order inference unit 110B uses features and top-level intentions' features for the execution order determination in Embodiment 2, so that it determines, in the example above, the execution order as "Simple sentence 2 first" in consideration of the top-level intentions' features. This makes the system execute the machine commands properly and infer the user's intentions accurately.

Of course, it is possible for some other components than those described to execute some of the functions of the intention inference system 1 and 1B described above. For example, some of the functions may be executed on an external server etc.

REFERENCE SIGNS LIST 1, 1B Intention inference system
101 Speech sound receiver
102 Speech recognizer
103 Morphological analyzer
104 Syntactic analyzer
105 Intention inference model storage
106 Intention inference unit
107 Feature extraction rule storage
108 Feature extractor
109, 109B Execution order inference model storage
110, 110B Execution order inference unit
111 Command execution unit
112 Response generator
113 Notification unit
114 Training data storage
115, 115B execution order inference model generator
150 Processor
160 Storage device
170 Input device
180 Output device

What is claimed is:

1. An intention inference system comprising:
a morphological analyzer to perform morphological analysis for a complex sentence with multiple intentions involved;
a syntactic analyzer to perform syntactic analysis for the complex sentence morphologically analyzed by the morphological analyzer and to divide it into a first simple sentence and a second simple sentence;
an intention inference unit to infer a first intention involved in the first simple sentence and a second intention involved in the second simple sentence;
a feature extractor to extract as a first feature a morpheme included in the first simple sentence indicating a relative timing of a first operation corresponding to the first intention, and to extract as a second feature a morpheme included in the second simple sentence indicating a relative timing of a second operation corresponding to the second intention; and
an execution order inference unit to infer a sequential order in which the first operation corresponding to the first intention and the second operation corresponding to the second intention are to be executed, the sequential order being inferred on the basis of the first feature and the second feature extracted by the feature extractor.

2. The intention inference system set forth in claim 1, wherein
the feature extractor extracts the first feature on the basis of a location of the morpheme in the first simple sentence and on the basis of a part-of-speech of the morpheme and extracts the second feature on the basis of a location of the morpheme in the second simple sentence and on the basis of a part-of-speech of the morpheme.

3. The intention inference system set forth in claim 1, further comprising:
a speech sound receiver to accept an input of a speech sound with multiple intentions involved; and
a speech recognizer to recognize speech sound data corresponding to the speech sound entering the speech sound receiver and to perform a conversion thereof into text data of a complex sentence with the multiple intentions involved.

4. The intention inference system set forth in claim 1, further comprising:
an operation execution unit to execute the first operation and the second operation on the basis of the sequential order inferred by the execution order inference unit; and
a notification unit to notify a user that the operation execution unit has executed the first operation and the second operation.

5. An intention inference system comprising:
a morphological analyzer to perform morphological analysis for a complex sentence with multiple intentions involved;
a syntactic analyzer to perform syntactic analysis for the complex sentence morphologically analyzed by the morphological analyzer and to divide it into a first simple sentence and a second simple sentence;
an intention inference unit to infer a first intention involved in the first simple sentence and a second intention involved in the second simple sentence;
a feature extractor to extract as a first feature a morpheme showing operation execution order included in the first simple sentence and to extract as a second feature a morpheme showing operation execution order included in the second simple sentence;
an execution order inference unit to infer execution order of the first operation corresponding to the first intention and the second operation corresponding to the second intention on the basis of the first feature and the second feature extracted by the feature extractor; and
an execution order information storage to store execution order information that shows scores of multiple features including the first feature and the second feature for each of execution order types of the first operation and the second operation,
wherein the execution order inference unit infers the execution order of the first operation and the second operation on the basis of the scores of the multiple features included in the execution order information.

6. The intention inference system set forth in claim 5, wherein
the execution order inference unit obtains scores of the first feature and scores of the second feature using the execution order information to infer the sequential order in which the first operation and the second operation are to be executed on the basis of final scores each obtained as a product of one of the scores of the first feature and one of the scores of the second feature.

7. The intention inference system set forth in claim 5, wherein
the execution order information storage also stores, for each of the execution order types of the first operation and the second operation, scores of multiple top-level intentions' features including a first top-level intention's feature which represents a classification or a function of the first intention and a second top-level intention's feature which represents a classification or a function of the second intention, and
the execution order inference unit infers the execution order of the first operation and the second operation on the basis of the scores of the multiple features and the scores of the multiple top-level intentions' features.

8. The intention inference system set forth in claim 7, wherein
the execution order inference unit infers the execution order of the first operation and the second operation on the basis of final scores each obtained as a product of one of the scores of the first feature, one of the scores of the second feature, one of the scores of the first top-level intention's feature, and one of the scores of the second top-level intention's feature.

9. An intention inference method comprising:
performing morphological analysis for a complex sentence with multiple intentions involved;
performing syntactic analysis for the morphologically analyzed complex sentence and dividing it into multiple simple sentences;
inferring intentions involved in each of the multiple simple sentences;
extracting as a feature a morpheme included in each of the multiple simple sentences indicating a relative timing of an operation corresponding to the intention inferred from the corresponding simple sentence; and
inferring a sequential order in which the operations corresponding to the inferred intentions are to be executed, the sequential order being inferred on the basis of the respective features included in the multiple simple sentences.

10. The intention inference method of claim 9, further comprising:
storing execution order information that shows scores of multiple features including the respective features included in the multiple simple sentences,
inferring the sequential order of the operations corresponding to the intentions involved in each of the multiple simple sentence on the basis of the scores of the multiple features included in the execution order information.

* * * * *